(12) United States Patent
Yu

(10) Patent No.: US 8,724,047 B2
(45) Date of Patent: May 13, 2014

(54) LCD DEVICE

(75) Inventor: Gang Yu, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 85 days.

(21) Appl. No.: 13/512,684

(22) PCT Filed: Mar. 16, 2012

(86) PCT No.: PCT/CN2012/072417
§ 371 (c)(1),
(2), (4) Date: May 30, 2012

(87) PCT Pub. No.: WO2013/134944
PCT Pub. Date: Sep. 19, 2013

(65) Prior Publication Data
US 2013/0242225 A1     Sep. 19, 2013

(30) Foreign Application Priority Data

Mar. 15, 2012  (CN) .......................... 2012 1 0068967.4

(51) Int. Cl.
*G02F 1/1333* (2006.01)
*G02F 1/1335* (2006.01)

(52) U.S. Cl.
USPC ............................................. 349/58; 349/65

(58) Field of Classification Search
USPC ..................................................... 349/58–65
See application file for complete search history.

(56) References Cited

U.S. PATENT DOCUMENTS

| | | | |
|---|---|---|---|
| 6,559,908 B2 * | 5/2003 | Hiratsuka et al. | 349/58 |
| 7,810,959 B2 | 10/2010 | Hsu et al. | |
| 8,384,838 B2 * | 2/2013 | Sugawara et al. | 349/58 |
| 2009/0168431 A1 | 7/2009 | Hsu et al. | |

FOREIGN PATENT DOCUMENTS

| | | |
|---|---|---|
| CN | 201322255 Y | 10/2009 |
| CN | 201354985 Y | 12/2009 |
| CN | 201757332 U | 3/2011 |
| CN | 102042536 A | 5/2011 |
| JP | 2011253769 A | 12/2011 |

* cited by examiner

*Primary Examiner* — Dung Nguyen
(74) *Attorney, Agent, or Firm* — IPro, Inc.; Na Xu

(57) ABSTRACT

The invention provides an LCD device, and the LCD device comprises a front frame, a middle frame, and a back frame in sequence from outside to inside. A light guide panel is arranged between the back frame and the middle frame. A cavity is formed by the middle frame, the back frame, and the light guide panel, and a light source assembly is arranged in the cavity. The middle frame is provided with a middle frame through hole communicated with the cavity, and the front frame is provided with a front frame through hole communicated with the middle frame through hole. Because the middle frame and the front frame of the invention are respectively provided with through holes, the heat accumulated in the cavity is directly dissipated to the outside through air convection. Compared with the heat dissipation mode of using conduction and air convection, the heat dissipation mode of the invention has the advantages of directness, simplicity, and convenience, thereby having preferable heat dissipation effect.

19 Claims, 3 Drawing Sheets

LCD DEVICE

TECHNICAL FIELD

The invention relates to the field of liquid crystal displays (LCDs), and more particularly to an LCD device.

BACKGROUND

As shown in FIG. 1, a conventional LCD module includes a front frame 100, a middle frame 200, a back frame 300, a light source assembly 400, a light source support 500, an LCD panel 600, a light guide panel 700, and some optical sheets (not shown in the figure). The components form a closed space A, so that the heat generated by the light source assembly 400 is conducted to the middle frame 200 via the closed space A and then to the LCD panel 600 in addition to being dissipated from the back frame 300, which brings certain damage to the liquid crystals packaged in the LCD panel 600, and even causes failure display in severe conditions.

Pat. Pub. No. U.S. 2009/0168431A1, published on Jul. 2, 2009, discloses a backlight module. The backlight module includes a light guide panel and a light emitting diode (LED) light source opposite to the light incident surface of the light guide panel, and further includes a plurality of air vents thermally connected with the LED light source. The LED light source is conducted into the air vents by means of heat conduction, and then heat is conducted outside through the air convection of the air vents. The heat dissipation mode includes heat conduction and air convection in sequence, with low heat dissipation efficiency. Thus, the heat dissipation effect is non-ideal.

Pat. Pub. No. CN201354985Y, published on Dec. 2, 2009, discloses an edge-light backlight module. The edge-light backlight module includes a lamp tube assembly which includes a lamp tube, a lamp tube reflector, and a lamp tube sleeve; the lamp tube sleeve covers the electrode parts at the low-voltage end and the high-voltage end of the lamp tube to protect the lamp tube. A back frame is arranged below the lamp tube assembly to support and fix the lamp tube assembly; a rubber frame covers the lamp tube assembly; the rubber frame is provided with an opening in the lamp tube sleeve at the low-voltage end of the lamp tube, and a filter screen is arranged on the opening. The technical scheme improves the heat dissipation effect of the low-voltage end of the lamp tube of the backlight module, however, the lamp tube reflector and the lamp tube still form a closed space, heat is not easy to dissipate, and the middle frame is in direct contact with the lamp tube reflector, thus a lot of heat is still conducted to the middle frame, and then to the LCD panel.

SUMMARY

In view of the above-described problems, the aim of the invention is to provide an LCD device with better heat dissipation effect.

The aim of the invention is achieved by the following technical scheme.

An LCD device comprises a front frame, a middle frame, and a back frame in sequence from outside to inside; a light guide panel is arranged between the back frame and the middle frame, a cavity is formed by the middle frame, the back frame, and the light guide panel, and a light source assembly is arranged in the cavity; the middle frame is provided with a middle frame through hole communicated with the cavity; and the front frame is provided with a front frame through hole communicated with the middle frame through hole.

Preferably, the front frame through hole coincides with the middle frame through hole in the communication position. Thus, the heat generated in the cavity is directly conducted into the front frame through hole without any obstruction after passing through the middle frame through hole, and then dissipated outside, thereby having high heat dissipation efficiency.

Preferably, the front frame through hole and the middle frame through hole are staggered. Because of the introduction of the middle frame through hole, a part of light generated by the light source assembly passes through the middle frame through hole, resulting in light leakage. The middle frame through hole is not aligned with the front frame through hole after being staggered, and one end of the middle frame through hole communicated with the front frame through hole is partially or totally aligned with the front frame, with function of shielding light and reducing light leakage.

Preferably, a baffle for preventing light leakage is arranged between the middle frame through hole and the light source assembly. The baffle can shield light at the light source side to better prevent light leakage.

Preferably, the baffle is extended from one end of the middle frame through hole communicated with the cavity, to cover one end of the light source assembly close to the middle frame through hole. This is a first specific mode for arranging the baffle.

Preferably, the light source assembly is a light emitting diode (LED) lightbar; the baffle is butted with one end of the LED light emitting surface close to one end of the middle frame through hole.

Preferably, the baffle is integrated with the middle frame. Integration has advantages of improving production efficiency and reducing production cost without additionally assembling the baffle in the assembling process.

Preferably, the baffle is in an independent structure, and fixed on the middle frame by one or more modes of sticking, riveting, welding, and screw fixing. Various standard baffles can be designed by the independent baffle structure in advance in accordance with different LCD devices, to increase the generality of the baffles and reduce the cost of design and manufacture.

Preferably, the baffle is extended from the back frame, to cover one end of the light source assembly close to the middle frame through hole. This is a second specific mode for arranging the baffle.

Preferably, the LCD device further comprises a light source support for fixing the light source assembly; the baffle is extended from the light source support, to cover one end of the light source assembly close to the middle frame through hole. This is a third specific mode for arranging the baffle.

Because the middle frame and the front frame of the invention are respectively provided with a through hole, the heat accumulated in the cavity is directly dissipated into the outside space through air convection. Compared with the heat dissipation mode using conduction and air convection, the heat dissipation mode of the invention has the advantages of directness, simplicity, and convenience, thereby having preferable heat dissipation effect.

Figure 1:
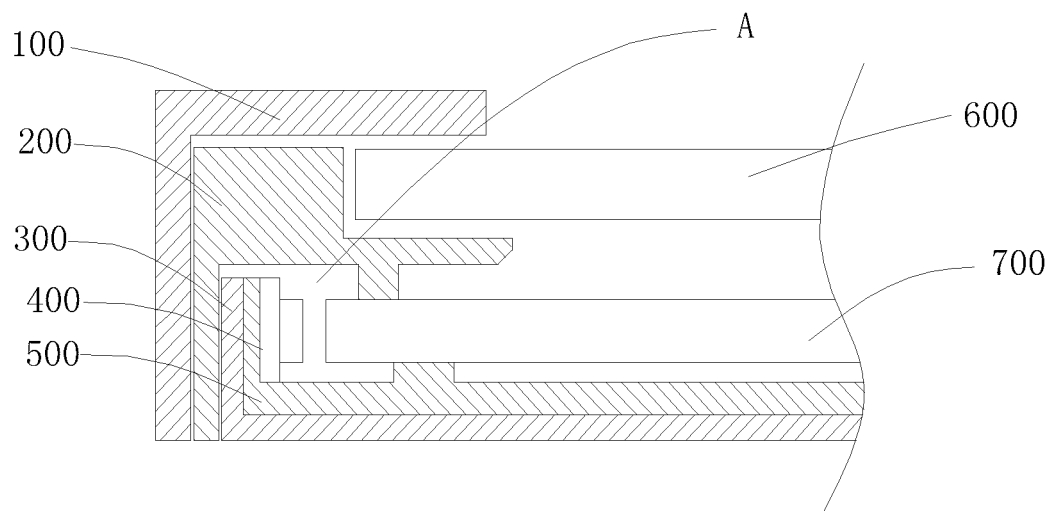
FIG. 1 is a schematic diagram of a conventional LCD device.

Legends: 100. front frame; 110. front frame through hole; 200. middle frame; 210. middle frame through hole; 220. baffle; 300. back frame; 400. light source assembly; 500. light source support; 600. LCD panel; 700. light guide panel; 800. cavity.

DETAILED DESCRIPTION

The invention will further be described in detail in accordance with the figures and the preferred examples.

As shown in FIGS. 2-6, an LCD device comprise a front frame 100, a middle frame 200, and a back frame 300 in sequence from outside to inside; an LCD panel 600 is arranged between the front frame 100 and the middle frame 200. Alight guide panel 700 is arranged between the back frame 300 and the middle frame 200. A cavity 800 is formed by the middle frame 200, the back frame 300, and the light guide panel 700, and a light source assembly 400 is arranged in the cavity 800; LED, or cold cathode fluorescent lamp (CCFL), etc. can be used as a light emitting source of the light source assembly 400. The light source assembly 400 can be directly fixed on the back frame 300, or can be fixed on the back frame 300 via a light source support 500 which is additionally arranged. The middle frame 200 is provided with a middle frame through hole 210 communicated with the cavity 800, and the front frame 100 is provided with a front frame through hole 110 communicated with the middle frame through hole 210. The middle frame through hole 210 and the front frame through hole 110 are disposed in pairs, with amount of one or more than one in accordance with the actual requirements for heat dissipation. The cavity 800 is an open space instead of a close space because of the introduction of the through holes.

Example 1

Figure 2:
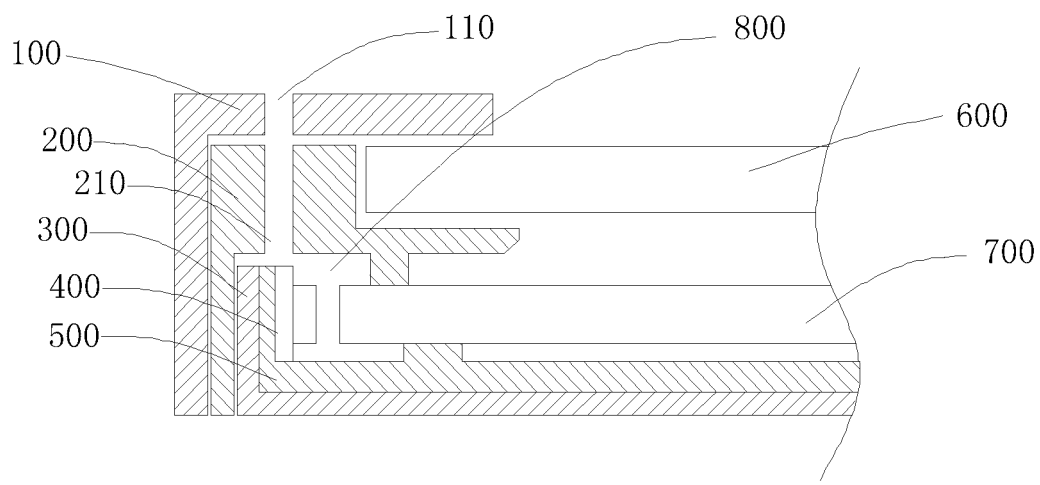
FIG. 2 is a structure diagram of a first example of the invention.

As shown in FIG. 2, the front frame through hole 110 coincides with the middle frame through hole 210 in the communication position. Thus, the heat generated in the cavity 800 is directly conducted into the front frame through hole 110 without any obstruction after passing through the middle frame through hole 210, and then dissipated to the outside, thereby having high heat dissipation efficiency.

Light leakage happens because of the introduction of the through holes. Thus, a baffle 220 for preventing light leakage is arranged between the middle frame through hole 210 and the light source assembly 400. Specifically, the baffle 220 is extended from one end of the middle frame through hole 210 communicated with the cavity 800, to butt one end of the light source assembly 400 opposite to the back frame 300. The baffle 220 can be integrated with the middle frame 200, thereby improving the production efficiency and reducing the production cost without additionally assembling the baffle 220 in the assembling process. Optionally, the baffle 220 can be in an independent structure, and fixed on the middle frame 200 by one or more modes of sticking, riveting, welding, and screw fixing. Thus, various standard baffles 220 can be designed in advance in accordance with different LCD devices, to increase the generality of the baffles 220 and reduce the cost of design and manufacture.

Figure 5:
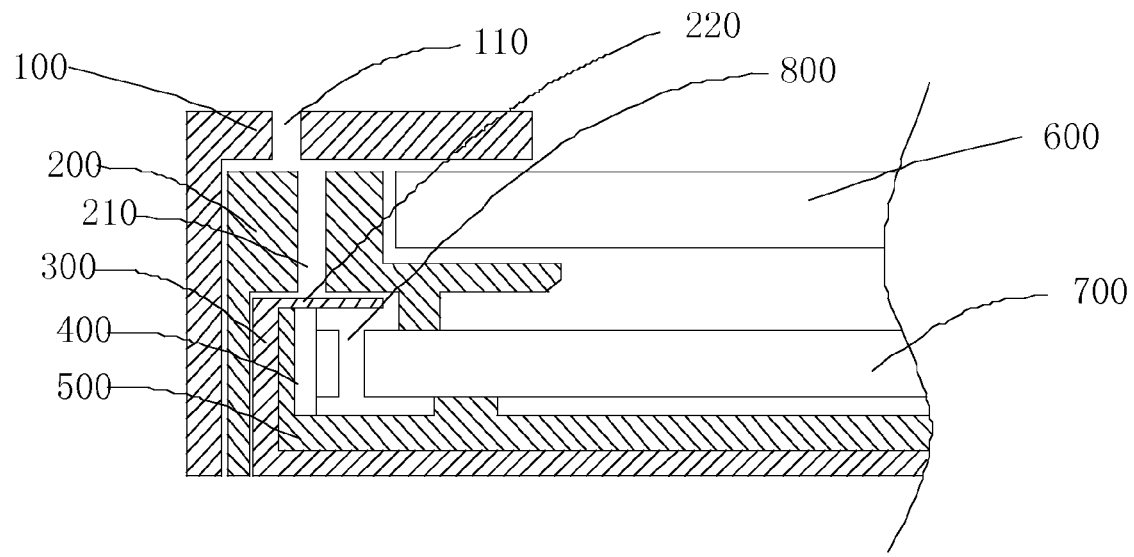
FIG. 5 is a schematic diagram of the invention in which a baffle is extended from a back frame.
Figure 6:
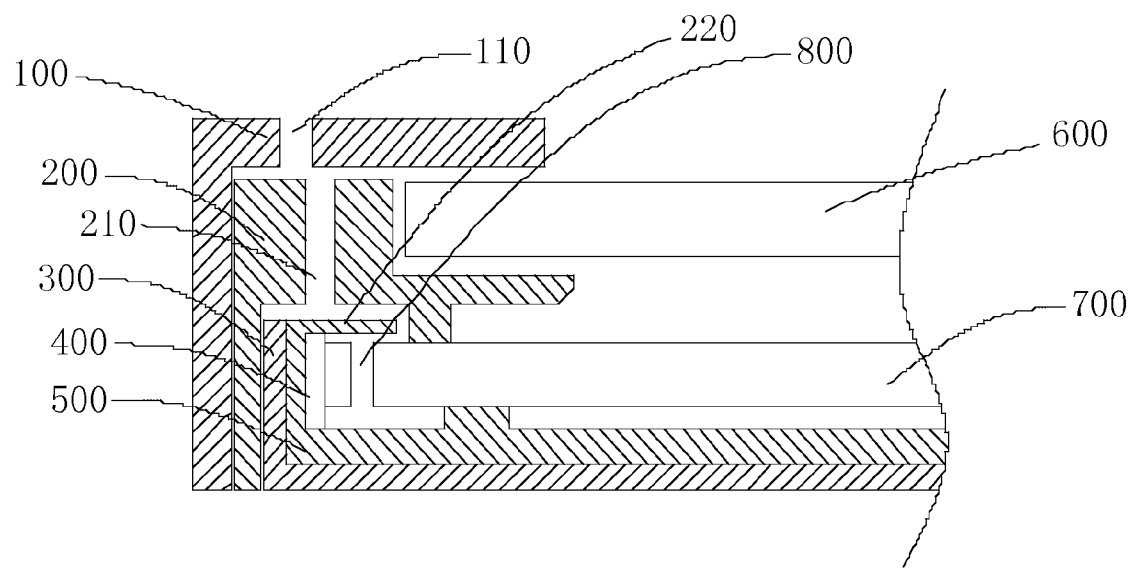
FIG. 6 is a schematic diagram of the invention in which a baffle is extended from a light source support.

As shown in FIG. 5 and FIG. 6, the baffle 220 can also be arranged using other modes, for example, the baffle 220 is extended from the back frame 300 or the light source support 500, to cover one end of the light source assembly 400 opposite to the back frame 300.

Example 2

Figure 3:
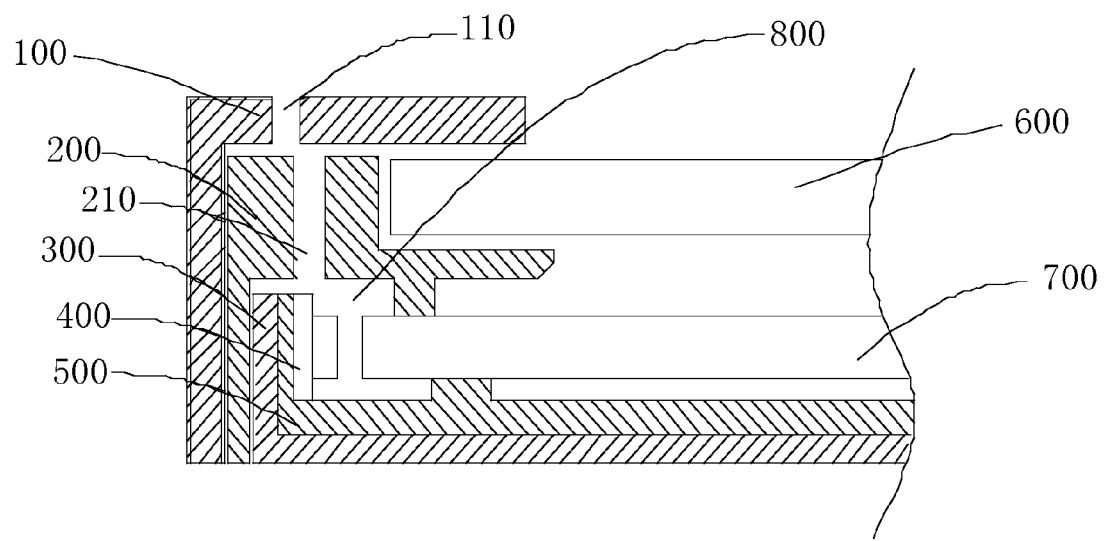
FIG. 3 is a structure diagram of a second example of the invention.

As shown in FIG. 3, the front frame through hole 110 and the middle frame through hole 210 are staggered. Because of the introduction of the middle frame through hole 210, a part of light generated by the light source assembly 400 also passes through the middle frame through hole 210, resulting in light leakage. The middle frame through hole 210 is not aligned with the front frame through hole 110 after being staggered, and one end of the middle frame through hole 210 communicated with the front frame through hole 110 is partially or totally aligned with the front frame 100, with function of shielding light and reducing light leakage.

Figure 4:
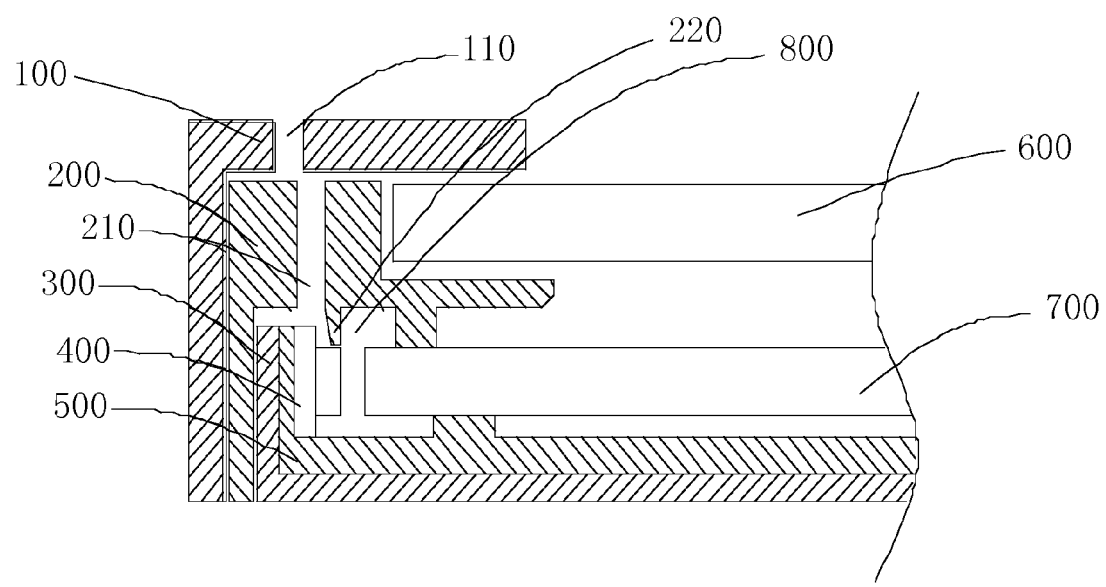
FIG. 4 is a schematic diagram of the invention in which a baffle is extended from a middle frame through hole.

Light leakage is inevitable because of the introduction of the through hole. Thus, the baffle 220 for preventing light leakage is arranged between the middle frame through hole 210 and the light source assembly 400. As shown in FIG. 4, the baffle 220 is extended from one end of the middle frame through hole 210 communicated with the cavity 800, to butt one end of the light source assembly 400 opposite to the back frame 300. The baffle 220 can be integrated with the middle frame 200, thereby improving the production efficiency and reducing the production cost without additionally assembling the baffle 220 in the assembling process. Optionally, the baffle 220 can be in an independent structure, and fixed on the middle frame 200 by one or more modes of sticking, riveting, welding, and screw fixing. Thus, various standard baffles 220 can be designed in advance in accordance with different LCD devices, to increase the generality of the baffles 220 and reduce the cost of design and manufacture.

As shown in FIG. 5 and FIG. 6, the baffle 220 can also be arranged using other modes, for example, the baffle 220 is extended from the back frame 300 or the light source support 500, to cover one end of the light source assembly 400 opposite to the back frame 300.

Because the middle frame 200 and the front frame 100 of the invention are respectively provided with through holes, the heat accumulated in the cavity 800 is directly dissipated to the outside through air convection. Compared with the heat dissipation mode using conduction and air convection, the heat dissipation mode of the invention has the advantages of directness, simplicity, and convenience, thereby having better heat dissipation effect.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. An LCD device, comprising: a front frame, a middle frame, and a back frame in sequence from outside to inside; wherein a light guide panel is arranged between said back frame and said middle frame; a cavity is formed by said middle frame, said back frame, and said light guide panel, and a light source assembly is arranged in said cavity; said middle frame is provided with a middle frame through hole communicated with said cavity, and said front frame is provided with a front frame through hole communicated with said middle frame through hole.

2. The LCD device of claim 1, wherein a baffle for preventing light leakage is arranged between said middle frame through hole and said light source assembly.

3. The LCD device of claim 2, wherein said baffle is extended from said back frame, to cover one end of said light source assembly close to said middle frame through hole.

4. The LCD device of claim 2, wherein said LCD device further comprises a light source support for fixing said light source assembly; said baffle is extended from said light source support, to cover one end of said light source assembly close to said middle frame through hole.

5. The LCD device of claim 2, wherein said baffle is extended from one end of said middle frame through hole communicated with said cavity, to cover one end of said light source assembly close to said middle frame through hole.

6. The LCD device of claim 5, wherein said baffle is integrated with said middle frame.

7. The LCD device of claim 5, wherein said baffle is in an independent structure, and fixed on said middle frame by one or more modes of sticking, riveting, welding, and screw fixing.

8. The LCD device of claim 5, wherein said light source assembly is an LED lightbar; said baffle is butted with one end of an LED light emitting surface close to said middle frame through hole.

9. The LCD device of claim 1, wherein said front frame through hole coincides with said middle frame through hole in a communication position.

10. The LCD device of claim 9, wherein a baffle for preventing light leakage is arranged between said middle frame through hole and said light source assembly.

11. The LCD device of claim 10, wherein said baffle is extended from one end of said t middle frame through hole communicated with said cavity, to cover one end of said light source assembly close to said middle frame through hole.

12. The LCD device of claim 11, wherein said light source assembly is an LED lightbar; said baffle is butted with one end of an LED light emitting surface close to said middle frame through hole.

13. The LCD device of claim 11, wherein said baffle is integrated with said middle frame.

14. The LCD device of claim 1, wherein said front frame through hole and said middle frame through hole are staggered.

15. The LCD device of claim 14, wherein a baffle for preventing light leakage is arranged between said middle frame through hole and said light source assembly.

16. The LCD device of claim 15, wherein said baffle is extended from one end of said middle frame through hole communicated with said cavity, to cover one end of said light source assembly close to said middle frame through hole.

17. The LCD device of claim 16, wherein said light source assembly is an LED lightbar; said baffle is butted with one end of an LED light emitting surface close to said middle frame through hole.

18. The LCD device of claim 16, wherein said baffle is integrated with said middle frame.

19. An LCD device, comprising: a front frame, a middle frame, and a back frame in sequence from outside to inside; wherein a light guide panel is arranged between said back frame and said middle frame; a cavity is formed by said middle frame, said back frame, and said light guide panel, and a light source assembly is arranged in said cavity; said middle frame is provided with a middle frame through hole communicated with said cavity, and said front frame is provided with a front frame through hole communicated with said middle frame through hole; said front frame through hole coincides or is staggered with said middle frame through hole in a communication position; a baffle for preventing light leakage is arranged between said middle frame through hole and said light source assembly; said light source assembly is an LED lightbar, and said baffle is butted with one end of an LED light emitting surface close to said middle frame through hole; said baffle is integrated with said middle frame; or said baffle is in an independent structure, and fixed on said middle frame by one or more modes of sticking, riveting, welding, and screw fixing.

* * * * *